Aug. 4, 1970

R. D. HASENBALG 3,522,509

FLOATING POWER SUPPLY

Filed Oct. 30, 1968

INVENTOR:
Ralph D. Hasenbalg

ATTORNEYS

Aug. 4, 1970 — R. D. HASENBALG — 3,522,509
FLOATING POWER SUPPLY

Filed Oct. 30, 1968 — 2 Sheets-Sheet 2

INVENTOR:
Ralph D. Hasenbalg

By Smyth, Roston & Pavitt
ATTORNEYS

United States Patent Office 3,522,509
Patented Aug. 4, 1970

3,522,509
FLOATING POWER SUPPLY
Ralph D. Hasenbalg, Thousand Oaks, Calif., assignor to Scientific Data Systems, Inc., Santa Monica, Calif., a corporation of Delaware
Filed Oct. 30, 1968, Ser. No. 771,773
Int. Cl. H02m 3/22, 7/00
U.S. Cl. 321—2                                6 Claims

ABSTRACT OF THE DISCLOSURE

A magnetic coupler for a power supply having a floating direct-current output. The power supply converts a direct current into a high-frequency alternating current. The coupler couples the input circuit to the output circuit with a minimum of magnetic leakage. The coupler has electrically conductive walls circumscribing a chamber for confining the magnetic flux. Any magnetic leakage is opposed by electric eddy currents on the film. The coupler has a geometric configuration so that no section through the coupler has a closed electric circuit in any plane transverse to the magnetic flux.

---

Figure 1:
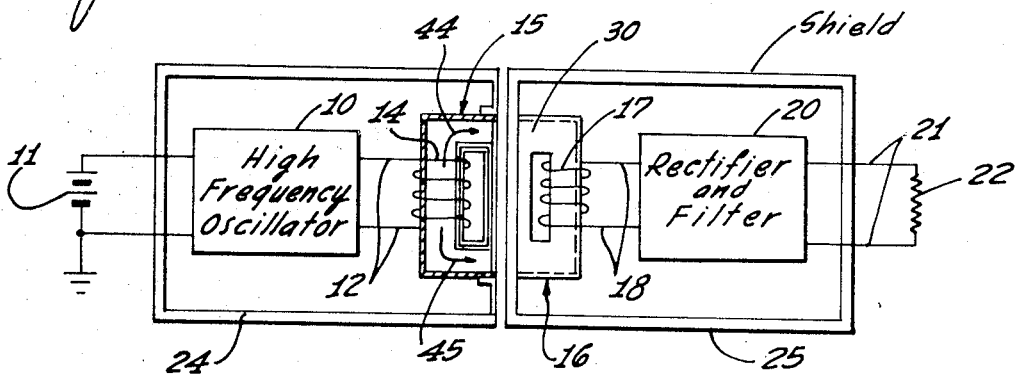

This invention relates generally to floating power supplies, and particularly relates to a magnetic coupler for coupling an alternating-current input circuit to an alternating-current output circuit of the power supply.

Floating power supplies are required to energize, for example, a differential amplifier. Such amplifiers are conventionally used in data acquisition. Thus, it may be necessary to amplify the differential input signal developed by a transducer, such as a thermocouple or strain gage, or the signal derived from a geophone used in seismic work. The amplified input signal may then be further processed by an analog or digital computer.

In view of the fact that one test may require a large number of transducers, it may be necessary to provide an equally large number of differential amplifiers. Each amplifier, in turn, may require one or more floating power supplies.

Conventionally, a floating power supply is obtained by transforming a direct-current (D-C) input voltage into an alternating-current (A-C) voltage at a relatively low frequency, such as, for example, 60 cycles per second. The A-C input voltage is then rectified and filtered to provide a D-C output voltage which is floating with respect to ground. Input and output circuits are conventionally isolated by a transformer.

As long as the power supply is operated at a relatively low frequency, the transformer requires an iron core and relatively heavy and expensive. Furthermore, the transformer must be properly shielded and such a shield is heavy, which again adds to the cost, size and weight of the power supply.

Since many power supplies may be required for a single system, both its size and weight may become of great importance. Hence, in accordance with the present invention, the power supply is operated at a high frequency which may be of the order of 10 to 20 megacycles (mc.). Due to the high frequency of the oscillator, the transformer does not require a magnetic core and can be made much smaller in size and light in weight.

It is, accordingly, an object of the present invention to provide a magnetic coupler for a D-C power supply having a floating D-C output, the coupler being of small size and easy to manufacture from relatively inexpensive parts.

A further object of the present invention is to provide a magnetic coupler for the purpose referred to, which has no cross section transverse to the closed magnetic flux path in which electric current can circulate around the flux path, so that electromagnetic energy is not dissipated.

Another object of the present invention is to provide a magnetic coupler or flux tube for a floating power supply which has maximum shielding and hence minimum leakage of the radio-frequency (R-F) power which might interfere with the proper operation of other electronic equipment such as a differential amplifier energized by the power supply.

It will be appreciated that leakage of the R-F power may become a serious problem, particularly where low-level signals must be amplified. Furthermore, any leakage of the R-F power reduces the efficiency of the power supply because any power that is dissipated represents an inefficiency of the design.

The magnetic coupler of the present invention is used within a floating power supply. The power supply may have a D-C source, a D-C-A-C converter, an output circuit including a rectifier for providing the necessary floating D-C output, and a coupler is provided between the D-C-A-C converter and the output circuit. In accordance with the present invention the alternating current is at a high frequency and the coupler operates as a magnetic flux confining tube to electromagnetically couple the source to the output circuit in such a manner as to minimize electromagnetic leakage.

The coupler itself consists of two possibly similar hollow portions supplementing each other to define a chamber having configuration of a doubly connected domain or region to serve as flux path. The hollow chamber of each coupler portion has two end windows corresponding to two, in principle diametrical, transverse cross sections through the desired flux path. At least the interior of each portion is electrically conductive and nonmagnetic. However, a gap-like discontinuity as far as electric conduction is concerned exists in each coupler portion. This gap-like discontinuity is essentially an electrically insulating portion or gap; it extends all along the flux path so that no closed electric current path exists around the magnetic flux anywhere in each coupler portion. The coupler portions are positioned so that either serves to close the magnetic flux path of the respective other one. There is a second electric conductive discontinuity in form of an insulating gap, which separates the two coupler portions from each other so that neither determines the electrical potential of the other. Thus, the coupler portions are electrically insulated from each other. The two coupler portions confine the closed magnetic flux to a path in a ring-like chamber, which more generally is a chamber that is doubly connected domain or region such as the interior space of a toroid. A primary winding is mounted on one coupler portion to set set up the magnetic flux, one or more secondary windings are mounted on the other coupler portion to respond to the flux therein.

Figure 2:
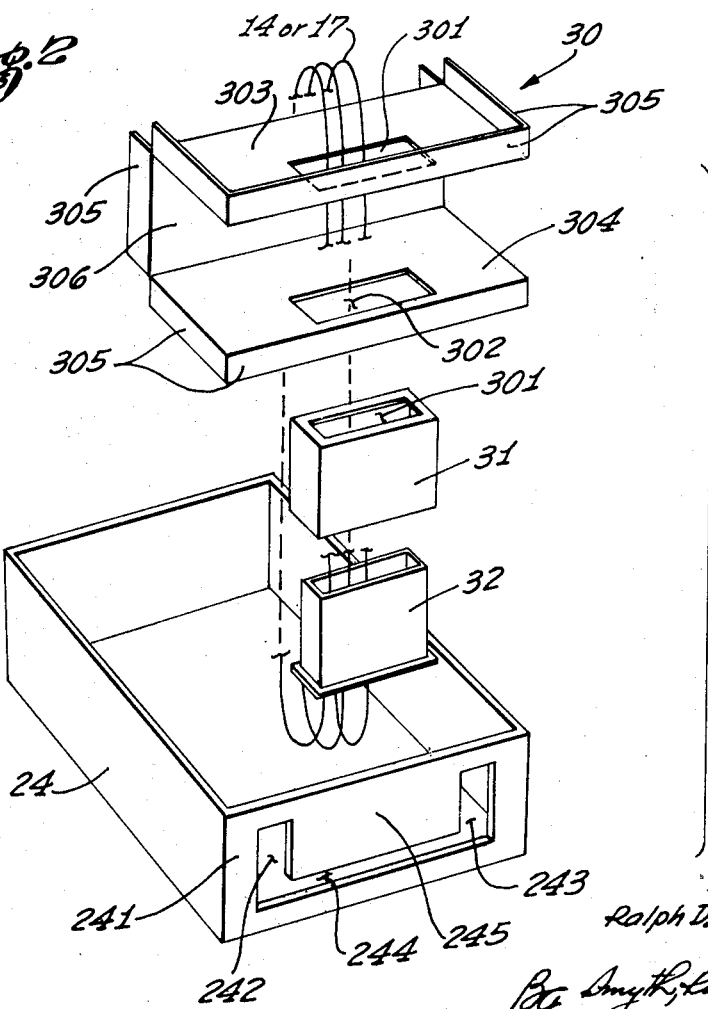
Figure 3:
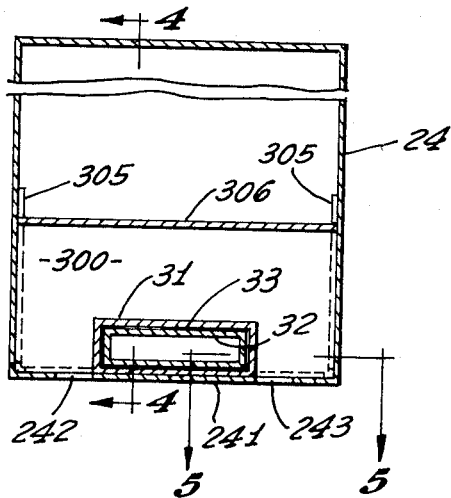
Figure 4:
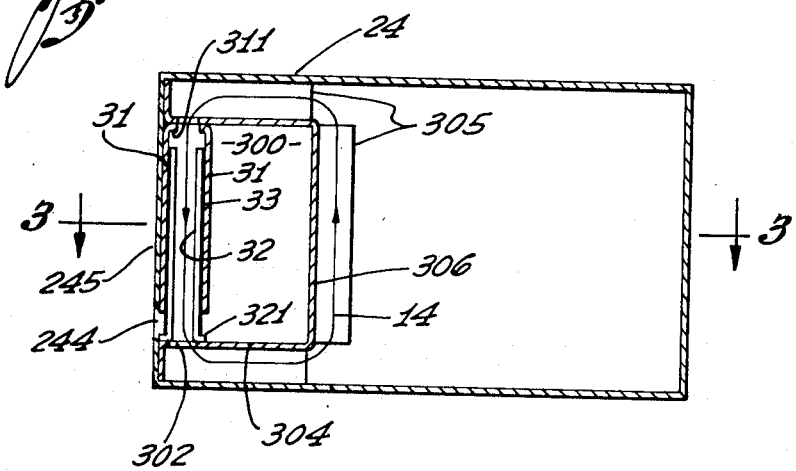
Figure 5:
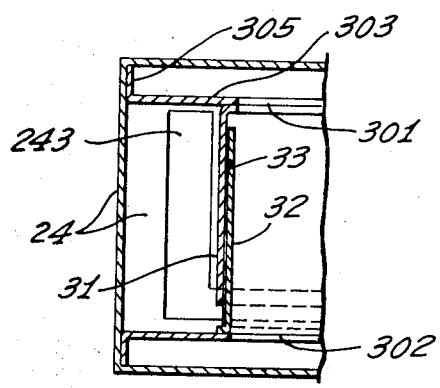

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 1 is a schematic top plan view with the cover removed of a D-C power supply having a floating output and embodying the coupler of the present invention;

FIG. 2 is a perspective view of several elements to be assembled for a coupler portion as used in the apparatus of FIG. 1; and FIGS. 3, 4 and 5 are sectional views through a coupler as assembled as indicated in FIG. 2, the sections being taken along lines 3—3, 4—4 and 5—5, respectively, as indicated.

Referring now to the drawings, there is illustrated a conventional floating power supply embodying a magnetic coupler in accordance with the present invention. Thus, the power supply has an oscillator 10 which is energized from a D-C source represented by a battery 11. One terminal of the battery 11 may be grounded as shown. In accordance with the present invention the oscillator 10 is a high-frequency oscillator for developing an A-C output at a frequency of the order of 10 or 20 mc. The oscillator 10 has output leads 12 which are connected to a winding 14 wound on one portion 15 of the magnetic coupler of the invention, having a second portion 16.

The second coupler portion 16 is also provided with a magnetic winding 17, which in turn is connected by leads 18 to a rectifier and filter 20 to develop the D-C output. This D-C output may be obtained from output leads 21 across which may be connected a load represented by a resistor 22. Thus it will be seen that the input circuit, including the oscillator 10 and coupler portion 15 is electrically isolated from the output circuit including the coupler portion 16 and the rectifier and filter 20. The coupler portions 15 and 16 may be juxtaposed to define a closed magnetic flux path, with an air gap between the coupler portions for electric insulation. However, for reasons of providing a uniform structure, it may be advisable to join the coupler portions by bonding them together, using an electrical insulating bonding agent. Therefore, the D-C output circuit is floating, that is, it is not tied to ground, as is the input circuit.

The high-frequency oscillator 10 and the coupler portion 15 are preferably enclosed or structurally combined in a conductive enclosure such as a metallic box 24 which may serve as an electric shield. Similarly the magnetic coupler portion 16 and the rectifier and filter 20 are enclosed in a box or housing 25 including an outer electric guard shield as shown. A guard shield such as shown at 25 also reduces the capacitance between the input circuit or ground and the floating D-C output.

Since the two coupler portions 15 and 16 are identical and are disposed as mirror images of each other, it is only necessary to describe one of them. In this connection reference is particularly made to FIGS. 2 through 5.

For example, magnetic coupler portion 15 consists of two electrically conductive, hollow and partially open box-like elements 31, 32 and a third element 30 completing a third box with a portion of box or guardshield 24. The boxes or elements 30, 31 and 32 are disposed in nesting relationship. Thus, each of the coupler portions consists of an outer or largest box as defined by elements 30 and 24, an intermediate box 31, and an inner or smallest box 32. The three elements 30, 31 and 32 consist of electrically conductive materials, such as, for example, copper or silver, as illustrated. Alternatively they may be constructed from insulating material having conductive coatings, which again may consist of copper or silver. It will be apparent that if the elements 30, 31 and 32 are of insulating material with a conductive surface coating, the coating should have thickness as great or greater than the depth of penetration of the skin effect at the operating frequency of the oscillator 10, which may, for example, be 10 mc. The surfaces of the outer or large element 30 adjacent the windings 14 and 17 may be provided with an insulating coating or may be covered with a thin insulating material. In addition, both of windings 14 and 17 preferably consist of a conductive wire such as copper, which is varnished for insulation.

Element 30 has a U-shaped cross section, as can be seen best in FIG. 2, with registering openings 301 and 302 respectively in the two portions 303 and 304 defining the legs of the U in the cross section. Element 30 has flanges 305 for attachment to the inner wall of housing 24 to complete therewith one of the three boxes referred to above. The wall 241 of housing 24 faces the housing 25 when the coupler portions 15 and 16 are positioned or mounted in coupling relationship. This wall 241 has two openings 242 and 243 and a slot 244 defining a tongue 245 as part of that wall 241.

The two boxes 31 and 32 are positioned in nested relationship with an insulating layer 33 in between, to remain insulated from each other. The two boxes, individually or when assembled, can also be regarded as a hollow duct of, for example, rectangular cross section. Box element 31 has a flange 311 with which it is joined (fused, welded, etc.) to wall part 306 in registering relation to opening 301. Correspondingly, flange 321 of box element 32 is joined to wall part 304 in registering relation to opening 302. This places an outer wall portion of element 31 in abutment with tongue 245.

The assembly thus defines a U-shaped chamber 300. The chamber communicates with the exterior through the two windows 242 and 243. The chamber 300 is particularly defined by the inner rear wall 306 of element 30, the walls of portions 303 and 304 facing each other, portions of housing 24 and the three outer surface walls of element 31 not facing tongue 241.

The winding 14 is wound through the interior of box 32, passed through openings 301 and 302, along the outer walls of the side portions 303 and 304 and along the outer wall of the part 306. Thus, magnetic flux is generated in chamber 300 having direction transverse to the plane of the drawing of FIGS. 4 and 5 but in the plane of the drawing of FIG. 3. The flux path would close along tongue 245 if coupler portion 15 is regarded by itself. In operation, however, the similarly constructed coupler portion 16 is positioned so that its windows corresponding to the windows 242 and 243 of coupler portion 15 register with these latter windows. The chamber 300', in coupler portion 16, registers with chamber 300 to define a doubly connected domain in form of a metal lined chamber as closed communication path which serves as a shielded magnetic flux guide and path.

In order to make certain that the metal of elements defining chamber 300 and serving as magnetic flux guide does not operate as short-circuited transformer winding, a closed circuit path in any plane transverse to the magnetic flux path must not be present. FIGS. 4 and 5 serves as representative examples for illustrating this point. The magnetic flux is enclosed by elements 303, 304, 306 and 31. However, there is a gap between elements 31 and 304. Box 32 is joined, possibly conductively joined to element 304, but boxes 31 and 32 are kept insulated from each other. Hence, current cannot circulate through these elements as a result of induction by the magnetic flux in chamber 301. Another circuit path could lead, for example, from element 304, through 306, 303 into 32 and 31, but the gap 244, as well as the insulation between 31 and 32, prevents closing of that circuit path.

Turning to FIG. 5, there is an electric conductive path leading, for example, from element 304 to one wall of box 24, into elment 302 and back into 31. The insulation between boxes 31 and 32 interrupts that path. Thus, nowhere is there an electric short-circuit path around the magnetic flux. The magnetic flux leakage resulting from the electric conduction discontinuity is negligible.

To state it differently, the metallic walls defining the chamber 300 was constructed such that magnetic flux can enter and leave windows 242 and 243. It now depends on the structure outside chamber 300 how the flux path closes. A similar chamber 300' (pertaining to coupler 16) is positioned to receive the magnetic flux, to guide the flux through the secondary winding and to return the flux to chamber 300. Thus the flux is confined by electrically conductive surfaces which are interrupted to the extent that they cannot serve as short-circuited secondaries.

The floating power supply of the present invention operates as follows: The oscillator 10 is energized by the battery 11 to develop high-frequency oscillations, which are impressed through the output leads 12 on the winding 14. This, in turn, sets up an electromagnetic field which circulates through chambers 300 and 300' and induces corresponding high-frequency oscillations in the winding 17. These oscillations are subsequently rectified and filtered by the equipment in block 20 to develop a floating direct current. This direct current is then obtained from output leads 21 and may be impressed on the load 22. It will also be appreciated that since the oscillator 10 operates at a high frequency, metallic walls suffice to confine the magnetic flux, because eddy currents in the surface prevent the magnetic flux from traversing the confinement.

There has thus been disclosed a magnetic coupler for a floating power supply. In accordance with the invention the oscillator of the power supply is operated at a high frequency which obviates the need for a magnetic core for the coupler. Furthermore, the coupler can be made very small in size and light in weight. Undesired R-F leakage is minimized by the fact that electric eddy currents induced in the conductive surfaces of the coupler tend to cancel undesired magnetic leakage. Furthemore, leakage may be additionally reduced by the provision of overlapping shields. The magnetic coupler is constructed of electrically conductive boxes in nesting relationship that no cross section of the coupler transverse to the closed magnetic flux path shows a closed electric circuit path which might dissipate the electromagnetic energy.

The invention and its attendant advantages will be understood from the foregoing description. It will be apparent that various changes may be made in the form, construction and arrangement of the parts of the invention without departing from the spirit and scope thereof or sacrificing its material advantages, the arrangement hereinbefore described being merely by way of example.

What is claimed is:

1. In direct current floating power supply comprising: a high frequency oscillator; an electromagnetic coupler comprising; a pair of hollow coupler elements, each defining a chamber with a pair of end windows, the elements positioned so that the windows of the pairs register to define an essentially closed, doubly connected chamber, the elements being electrically insulated from each other; first winding means on one of the coupler elements connected to the oscillator to induce high frequency magnetic flux into the closed chamber; the coupler elements having gap-like electric conduction discontinuity in any cross sectional plane transverse to the direction of the magnetic flux path through said closed chamber, to prevent electric current from circulating through the elements around the magnetic flux; second winding means on the other one of the coupler elements to generate a voltage when the magnetic flux traverses the closed chamber; and rectifier means connected to the second winding means to provide a D-C output voltage.

2. A floating power supply as defined in claim 1 wherein said coupler includes a guard shield to minimize undesired electromagnetic radiation.

3. A floating power supply as defined in claim 1 wherein the frequency of said alternating-current source is on the order of 10 megacycles, whereby said coupler reduces electromagnetic leakage by creating electric eddy currents on the surfaces thereof.

4. An electromagnetic coupler, comprising: a pair of hollow coupler elements, each having electrically conductive walls defining a chamber with a pair of end windows, the elements of the pair being positioned so that the windows of the pairs register to define an essentially doubly connected chamber; means on one of the coupler elements of the pair to induce magnetic flux in the chamber of the one element to circulate through said closed chamber, traversing the chamber of the other one of the elements of the pair; and means on the other coupler element to be responsive to the circulating flux to provide electrical voltage and current in response thereto, the elements having a gap-like electric conduction discontinuity in any cross sectional plane transverse to the direction of the magnetic flux path through said closed chamber, to prevent electric current from circulating in any said plane through the elements around the magnetic flux.

5. An electromagnetic coupler, comprising: means defining a chamber in form of a doubly connected domain having at least in the interior an electrically conductive wall, there being a gap-like electric conduction discontinuity in the wall to prevent electric current to flow in the wall in a closed path parallel to the ring path in the chamber, there being another gap-like electric conduction discontinuity in the wall to prevent current to flow in the wall of the chamber in a closed path in any plane transverse to the ring path of the chamber; high frequency magnetic flux inducing means coupled to the ring chamber to provide magnetic flux along the ring chamber; and variable magnetic flux responsive means coupled to the chamber to provide electrical signals in response to the flux as induced by the flux inducing means.

6. An electromagnetic coupler, comprising: means defining a substantially ring-shaped chamber having at least in the interior an electrically conductive wall, there being a gap-like conduction discontinuity in the wall to prevent current flow in the wall of the chamber in a closed path in any plane transverse to the ring path of the chamber; high frequency magnetic flux inducing means coupled to the ring chamber to provide magnetic flux along the ring chamber means; and variable magnetic flux responsive means coupled to the chamber to provide electrical signals in response to the flux as induced by the flux inducing means.

References Cited

UNITED STATES PATENTS

| | | | |
|---|---|---|---|
| 2,837,651 | 6/1958 | Schultz. | |
| 2,895,059 | 7/1959 | Bell. | |
| 2,948,871 | 8/1960 | Craige | 336—84 XR |
| 3,009,115 | 11/1961 | Johnson | 321—2 XR |
| 3,277,358 | 10/1966 | Nicholl | 336—95 XR |
| 3,292,579 | 12/1966 | Buchanan | 336—221 |
| 3,435,320 | 3/1969 | Lee et al. | 321—2 |
| 3,465,232 | 9/1969 | Weber | 321—8 |

WILLIAM H. SHOOP, JR., Primary Examiner

U.S. Cl. X.R.

321—8; 336—84